March 20, 1962 J. H. ANDERSON 3,025,880
SLEEVE VALVES
Filed June 21, 1957 2 Sheets-Sheet 1
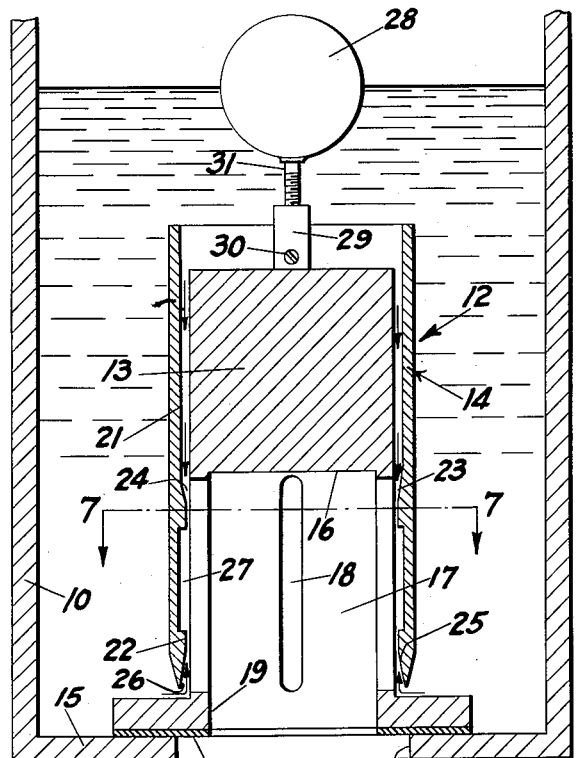
FIG. 1
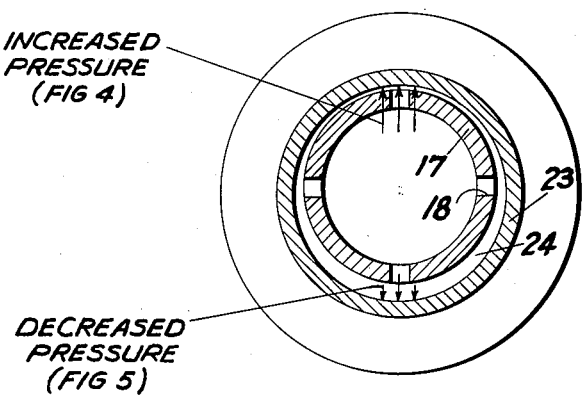
INCREASED
PRESSURE
(FIG 4)
DECREASED
PRESSURE
(FIG 5)
FIG. 7
INVENTOR.
JAMES H. ANDERSON
BY
ATTORNEY March 20, 1962 J. H. ANDERSON 3,025,880
SLEEVE VALVES
Filed June 21, 1957 2 Sheets-Sheet 2

INVENTOR.
JAMES H. ANDERSON
BY
Sidney N. Rosenfeld
ATTORNEY

United States Patent Office 3,025,880
Patented Mar. 20, 1962

3,025,880
SLEEVE VALVES
James H. Anderson, Spring Garden Township, York County, Pa., assignor to Borg-Warner Corporation, Chicago, Ill., a corporation of Illinois
Filed June 21, 1957, Ser. No. 667,159
3 Claims. (Cl. 137—625.33)

This invention relates to flow regulating valves, and more particularly to that type of valve known as a sleeve valve.

In the type of valve commonly known as a sleeve valve and generally utilized for maintaining a liquid level within a tank, there is generally provided a body member surrounding the outlet of the tank and including a liquid inlet for fluid flow through the body member to the tank outlet. A sleeve member generally surrounds the body member and slidably coacts with it to close the liquid inlet, or to vary liquid flow therethrough. The sleeve member is generally raised and lowered on the body member by a float.

It will be apparent that the sleeve could be mounted internally of the body member and that it could be operated by power means other than a float.

In such a sleeve valve when any unbalanced force within the tank tends to disturb the concentric relationship between sleeve and body member, the sleeve tends to assume an eccentric position with respect to the body member. In this position the sleeve and body member tend to be bound together considerably increasing the force necessary to raise the sleeve.

In a float operated valve, this binding force can be so great as to overcome the natural buoyancy of the float thereby maintaining the valve in its closed position. Even in a power operated valve, this binding force can considerably increase the power needed to raise such a sleeve. The problem becomes aggravated as the valve size increases.

It is an object of this invention to provide a sleeve valve including a self-centering sleeve member.

Yet another object of the invention is to provide a sleeve valve including a sleeve member and body member in concentric relationship and wherein means are provided for maintaining such concentricity.

It is a further object of the invention to provide a sleeve valve so designed that a tapered passageway is provided between sleeve and body members. This passageway must be tapered in the direction of fluid flow between the sleeve and body member. Whenever an imbalance tends to move the sleeve eccentrically, a force is set up within the tapered passageway opposing such imbalance and returning the sleeve to its concentric position.

The invention consists of the novel constructions, arrangements and devices to be hereinafter described and claimed for carrying out the above-stated objects and such other objects as will appear from the following description of preferred embodiments of the invention described with reference to the accompanying drawings, in which:

FIG. 1 is an elevational view in section of a tank having a sleeve valve, according to the invention, mounted therein;

FIG. 7 is a view taken on the line 7—7 of FIG. 1, showing portions of the valve in a non-concentric relationship and exaggerated in parts thereof for purposes of clarity.

Figure 6:
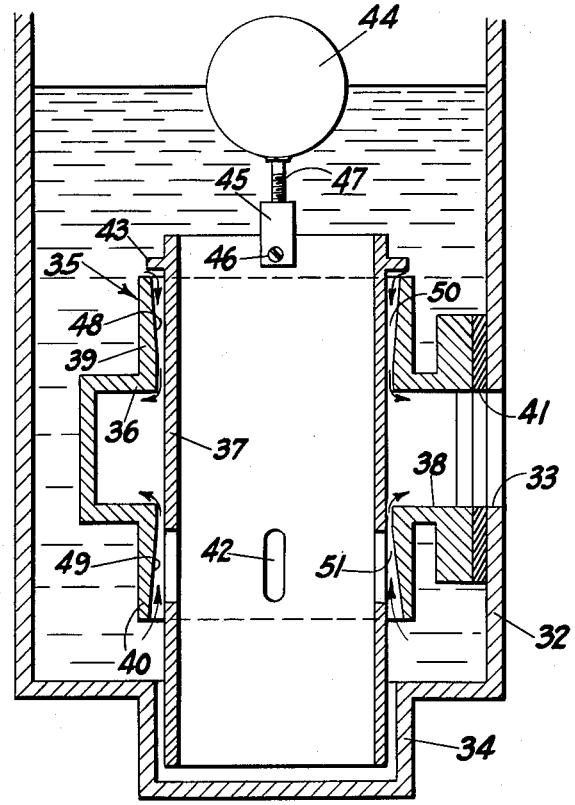
FIG. 6 is a view similar to FIG. 1 but showing a modification.

Turning now to FIG. 1, a tank in which a fluid level is to be maintained is shown at 10 and includes a liquid outlet 11. A sleeve valve shown generally at 12 is provided for regulating the flow through the liquid outlet 11.

A typical example of the use of such a valve would be in a large refrigerating system. In such a system a condenser and evaporator are generally provided, operating at different pressures and some means must be provided for feeding refrigerant liquid from the condenser to the evaporator and for maintaining the difference in pressure. This can conveniently take the form of a sleeve valve as shown, in which the liquid maintained within the tank 10 acts as a liquid seal between the high condenser pressure and the low evaporator pressure while the system is operating.

Sleeve valve 12 includes a body member 13 and a sleeve member 14. As shown, body member 13 and sleeve member 14 are circular in cross section and concentrically disposed one within the other. It will be apparent, however, that the specific cross-sectional geometric shape may vary, so long as the two are the same shape and concentric. It will be obvious that, as used herein and in the claims, the word "concentric" is used in its broad sense as set out above, rather than in its narrow sense of indicating circular bodies one within the other.

The body member 13 is seated on the bottom 15 of the tank 10 and surrounds the liquid outlet 11. Body member 13 is formed with a cylindrical bore 16 defined by an outer wall portion 17 which has valve inlet ports 18 therein. The bore 16 is open on its bottom to provide a fluid outlet 19 which coincides substantially with the tank outlet 11. As shown, four inlet ports 18 are provided but it will be apparent that any number may be provided adapted to give the desired flow rate. A gasket 20 is disposed between the body member 13 and the bottom 15 of the tank 10.

Sleeve member 14 regulates the flow through inlet ports 18. As shown in FIG. 1, the flow through inlet ports 18 is substantially cut off. As is apparent from an inspection of FIG. 1, sleeve member 14 surrounds the body member 13. The sleeve member 14 has an upper bore portion 21 and a lower bore portion 22 of a smaller internal diameter. In the closed position of the valve, the portion 22 is opposed to the inlet ports 18 in the body member. Portions 21 and 22 are joined by a tapered portion 23 defining a tapered passageway 24 between the sleeve member and body member. A tapered portion 25 is provided at the lower end of the sleeve 14 and defines a second tapered passageway 26 between the two members 13 and 14. The portion 22 is provided with a counter bore 27 for reducing frictional forces between the body and sleeve members 13 and 14.

As shown, a ball float 28 is provided for raising and lowering sleeve member 14 according to the level of the liquid within the tank 10. A bracket 29 is provided and is connected to sleeve member 14 by a pin 30 extending therethrough, with the bracket 29 receiving one end of a rod 31. The other end of rod 31 is suitably connected to the ball float 28.

In operation, as the level of liquid within tank 10 rises, ball float 28 rises with it carrying sleeve member 14 upward. It will be apparent that as sleeve member 14 is raised, a greater portion of the ports 18 is uncovered allowing for progressively greater liquid flow therethrough. This tends to maintain the liquid level constant within the tank. With sleeve member 14 in its raised position, liquid flows from the tank and through inlet ports 18 and thence through outlet 19 in body member 13 and thence through the tank outlet 11.

In the construction shown in FIG. 1, there will always be a liquid flow through the valve in the directions shown by the arrows. This flow is in two directions between the body member and sleeve member, as shown, and is utilized to main the two in concentric relationship. The necessity for two tapered passageways is, therefore, explained, since one such passageway should be provided wherever there is liquid flow between body member and sleeve member, with the taper being in the direction of flow.

Any force tending to move the sleeve member 14 eccentrically with respect to body member 13 to its FIG. 7 position, is opposed by an increased pressure in the opposite direction due to a portion of one of the tapered passageways becoming constricted by the eccentrically disposed sleeve member 14, so as to move sleeve member 14 back to concentric position with respect to body member 13.

An inspection of FIGS. 2 to 5 and 7 will point out the various forces acting to maintain the above concentricity.

Figure 2:
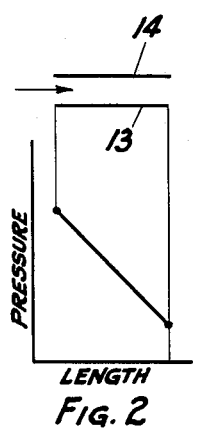
FIGS. 2, 3, 4 and 5 are graphs showing varying pressure drops through a passageway, assuming steady flow, and according to the particular configuration of the passageway.
Figure 3:
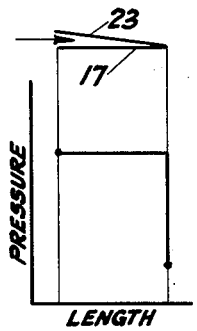
Figure 4:
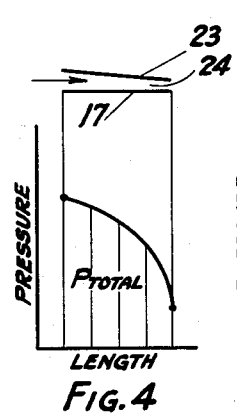

FIG. 2 shows a passageway wherein the two opposed walls (representing sleeve 14 and body member 13) are parallel. In such a passageway, assuming an initial entering pressure and leaving pressure, the pressure drop along the length of the passageway is constant and is represented in FIG. 2 by a straight line function. FIG. 3 shows a tapered passageway (representing tapered portion 23 of sleeve 14 and wall portion 17 of body member 13) in which the two opposed walls of the passageway actually touch. It will be apparent that the pressure within the passageway will be a constant at all points and will drop to zero at the point where the walls of the passageway meet. It will be further apparent that as the walls of the tapered passageway begin to separate, as shown in FIG. 4, the curve representing the pressure drop along the length of the passageway will begin to approach the straight line curve of FIG. 2; the greater is the separation between the walls of the passageway, the more closely will the curve approache the FIG. 2 curve. This is shown graphically in FIGS. 4 and 5. An inspection of FIGS. 4 and 5 will reveal that the total pressure acting on the walls of the passageway, which is represented by the area beneath the curve, will be greater as the walls of the passageway approach together.

Figure 5:
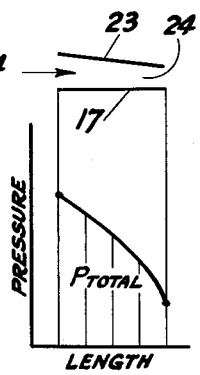

Turning now to FIG. 7, in conjunction with FIGS. 4 and 5, with the flow being into the plane of the paper as seen in FIG. 7, or from left to right as seen in FIGS. 4 and 5, it will be apparent that as the sleeve member 14 tends to assume an eccentric position with respect to the body member 13, there will be one point at which the sleeve member will tend to approach the body member thereby building up the pressure at that point, comparable to the FIG. 4 illustration, and shown as an increased pressure area in FIG. 7. Diametrically opposite to such a point the distance between the sleeve and body members will tend to increase decreasing the pressure at that point, comparable to the FIG. 5 illustration and shown as a decreased pressure area in FIG. 7. The resultant force will be of a magnitude in a direction to move the sleeve member away from the body member at the constricted point, thus maintaining the sleeve member centered with respect to the body member.

Although there will be some shifting of the flow in the narrowing passageway between the sleeve member and body member as one approaches the other, this shifting of the flow will not be sufficient to invalidate the conclusions reached herein. For the purpose of the discussion herein and for illustrating the problems involved therefor, a constant flow may be assumed.

It will be apparent that the principle works, whether or not the sleeve member surrounds the body member or is internally mounted therein. It also makes no difference in the operation whether the taper is built in the sleeve member or on the body member, so long as the passageway therebetween converges in the direction of fluid flow.

In FIG. 6 a sleeve valve is shown having such an internal sleeve and with the taper built in the body member.

Turning now to FIG. 6, there is shown a tank 32 in which it is desired to maintain a specific liquid level. In this instance, the tank is provided with an outlet 33 on a side wall thereof and includes a well portion 34 for receiving the valve sleeve. The valve as a whole is indicated numerically by the number 35 and includes a body member 36 and sleeve member 37.

The body member includes an outlet 38 surrounding the outlet 33 of the tank 32 and cylindrical portions 39 and 40. A gasket 41 is seated between the tank wall and body member.

The sleeve 37 is of a straight cylindrical construction having flow controlling ports 42 therethrough and includes a stop abutment 43 for limiting the downward movement of the sleeve. A ball float 44 is provided for raising and lowering the sleeve according to the liquid level within the tank. A connection 45 is provided and is pinned to sleeve 37 by a pin 46. A rod 47 has one end suitably mounted within connection 45 and the other end attached to the ball float 44.

An inspection of FIG. 6 reveals that the cylindrical portions 39 and 40 of the body member 36 have tapers 48 and 49 machined therein. These tapers define, in connection with the sleeve member 37, tapered passageways 50 and 51 respectively, with the tapers being in the direction of fluid flow between the sleeve and body members.

As the liquid level within the tank rises, raising ball float 44 and with it sleeve 37, flow controlling ports 42 will begin to register with valve outlet 38 allowing liquid to flow through the ports 42, valve outlet 38 and through tank outlet 33 to exit the tank. As in the FIG. 1 construction, there always will be fluid flow between the body member 36 and sleeve member 37 in both directions. Due to the tapered passageways 50 and 51, in the path of the fluid flow, and tapering in the direction of such flow, similar forces are set up as in the FIG. 1 construction to maintain the concentricity of the two members.

As pointed out above, it is immaterial as to whether the taper is built in the body portion or the sleeve portion. In this instance, it will be seen that if the taper were built in the sleeve portion, when the valve is in its fully open position, the taper would be positioned above the body member and would, therefore, have no effect on the flow between the body member and the sleeve member.

It will be apparent from the foregoing that those considerations influencing the positioning of the taper will depend on design features and manufacturing problems, which are quite unrelated to the problem of maintaining the concentricity of the sleeve and body members. As has been pointed out hereinabove, the sole criterion is that there be a tapered passageway between the sleeve member and body member, with the passageway tapering in the direction of fluid flow.

Whether the sleeve be internal of the body member or external thereof is also a matter of little moment here. Such a selection would also depend on design problems and manufacturing problems unrelated to the problem disclosed herein.

I wish it to be understood that my invention is not to be limited to the specific constructions and arrangements shown and described, except only insofar as the claims may be so limited, as it will be apparent to those skilled in the art that changes may be made without departing from the principles of the invention.

What is claimed is:

1. A valve comprising a stationary cylindrical body member defining an axial fluid outlet and including a fluid inlet port through a wall thereof, a cylindrical sleeve member encircling said body member and freely movable with respect thereto, means for axially moving said sleeve member with respect to said body member for progressively exposing varying areas of said inlet port to fluid flow for regulating fluid flow therethrough to said outlet, said sleeve member being proportioned to provide an annular fluid flow path between said body and sleeve members for continual flow of fluid therebetween to said inlet port, and means defining a tapered fluid passageway in at least a portion of the axial length of said path and throughout the circumference thereof whatever the axial position of said sleeve member, said tapered passageway converging in the direction of fluid flow therethrough.

2. A valve comprising a stationary cylindrical body member defining a fluid outlet; a cylindrical sleeve member mounted within said body member, said sleeve member having a fluid inlet port through a wall thereof; means for axially moving said sleeve member with respect to said body member whereby said fluid inlet port and said outlet are in full registry, partial registry or out of registry, for regulating fluid flow through said inlet port to said outlet; said members being proportioned to provide a fluid flow path therebetween for continual flow of fluid to said outlet; and means defining a tapered fluid passageway in at least a portion of said path, the walls of said tapered passageway converging in the direction of fluid flow therethrough.

3. In a valve of the type comprising a stationary cylindrical body member defining a fluid outlet, a cylindrical sleeve member mounted within said body member, said sleeve member having a fluid inlet port through a wall thereof, means for axially moving said sleeve member with respect to said body member whereby said fluid inlet port and said outlet are in full registry, partial registry or out of registry, for regulating fluid flow through said inlet port to said outlet; the improvement comprising said members being proportioned to provide a fluid flow path therebetween for continual flow of fluid therethrough to said outlet, and means defining a tapered fluid passageway in at least a portion of said path, the walls of said tapered passageway converging in the direction of fluid flow therethrough.

References Cited in the file of this patent

UNITED STATES PATENTS

| | | |
|---|---|---|
| 656,629 | Cotter | Aug. 28, 1900 |
| 1,958,698 | Fox | May 15, 1934 |
| 2,089,419 | Peo | Aug. 10, 1937 |
| 2,170,500 | Knowlton | Aug. 22, 1939 |
| 2,324,402 | Kocher | July 13, 1943 |
| 2,360,733 | Smith | Oct. 7, 1944 |
| 2,731,031 | Newhouse | Jan. 17, 1956 |

FOREIGN PATENTS

| | | |
|---|---|---|
| 57,306 | Austria | Jan. 25, 1913 |
| 89,018 | Austria | July 25, 1922 |
| 565,610 | Germany | Dec. 2, 1932 |
| 316,239 | Switzerland | Nov. 15, 1956 |